United States Patent [19]

Colao

[11] 3,897,987
[45] Aug. 5, 1975

[54] BEARING PROTECTION ASSEMBLY
[75] Inventor: Angelo A. Colao, Bedford, Mass.
[73] Assignee: Sanders Associates, Inc., South Nashua, N.H.
[22] Filed: Apr. 18, 1974
[21] Appl. No.: 462,142

[52] U.S. Cl............ 308/184 R; 308/178; 308/237 A
[51] Int. Cl.² ........................................ F16C 27/00
[58] Field of Search.... 308/178, 177, 184 R, 184 A, 308/22, 26, 237 R, 237 A

[56] References Cited
UNITED STATES PATENTS
| | | | |
|---|---|---|---|
| 1,904,395 | 4/1933 | Whitehead | 308/178 X |
| 3,214,225 | 10/1965 | Warnery | 308/177 |

FOREIGN PATENTS OR APPLICATIONS
| | | | |
|---|---|---|---|
| 43,506 | 2/1914 | Sweden | 308/178 |
| 299,810 | 10/1929 | United Kingdom | 308/184 R |

Primary Examiner—M. Henson Wood, Jr.
Assistant Examiner—Randolph A. Reese
Attorney, Agent, or Firm—Louis Etlinger; Richard I. Seligman

[57] ABSTRACT

Protection of ball bearings from destructive loads caused by high acceleration of short duration is achieved by arranging such bearings in an assembly which can undergo lateral translation during such high accelerations such that the inner and outer races of the bearings will simultaneously come to a stop during such lateral translation.

6 Claims, 1 Drawing Figure

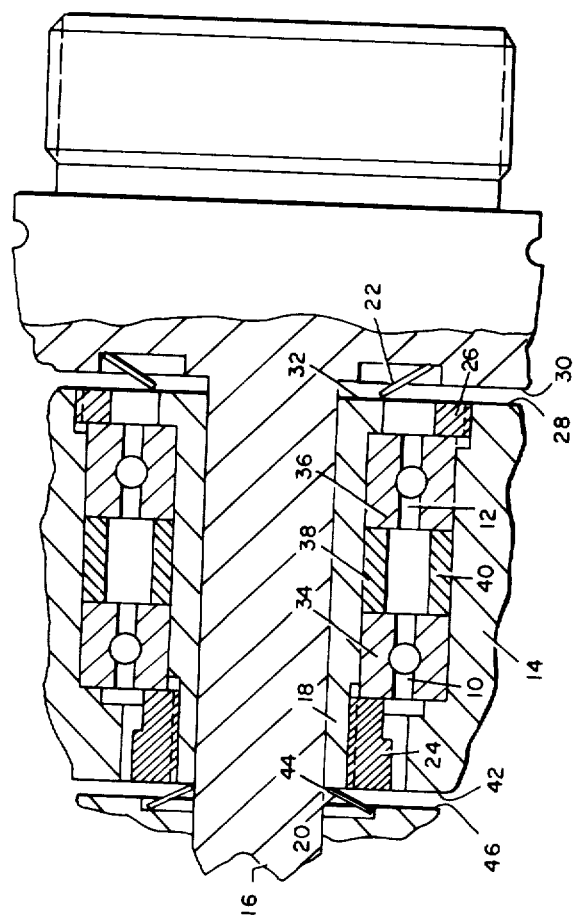

BEARING PROTECTION ASSEMBLY

BACKGROUND OF THE INVENTION

There are many applications wherein bearings are subjected to very high loads for short durations. One particular application concerns a gunfired projectile as described in patent application Ser. No. 392,716, filed Aug. 10, 1973 and assigned to the assignee of the present invention. The projectile includes a stationary member and a rotating member which rotating member is arranged about the stationary member for rotation with respect thereto. The rotating member is supported by the stationary member by bearings.

A projectile achieves high acceleration during firing which acceleration produces excessive load on the bearings. Conventionally, in such a situation the bearings would be made large enough to satisfy this momentary maximum load condition. Making the bearings of such large dimensions can be undesirable from many points of view since the loads encountered during the maximum usage of the device would be very much smaller and accordingly, not require the large size bearings. Also, in many applications such as the aforementioned projectile, size limitations of the projectile are such that bearings of sufficient size to withstand the large loads under acceleration could not be used.

SUMMARY OF THE INVENTION

Accordingly, it is an object of this invention to provide improved apparatus for protection of bearings from destructive loads of short duration.

It is a further object of this invention to provide means for shunting loads caused by momentary high acceleration past ball bearings during such momentary high acceleration.

Briefly, an assembly including concentric members separated by ball bearings for relative rotation, protection of the ball bearing from destructive loads caused by momentary high acceleration is achieved by shunting the loads past the balls of the bearings during this momentary high acceleration condition. The bearings are arranged in an assembly and disposed between a pair of springs for lateral translations such that when the assembly is momentarily accelerated the assembly will undergo such lateral translation and cause the inner and outer races of the bearings to come to a stop simultaneously.

BRIEF DESCRIPTION OF THE DRAWING

The above-mentioned and other features and objects of this invention will become more apparent by reference to the following description taken in conjunction with the accompanying drawing in which there is shown, in section, apparatus for providing protection of bearings under momentary high load conditions.

DESCRIPTION OF PREFERRED EMBODIMENT

Referring now to the FIGURE there is shown therein apparatus for protection of a pair of ball bearings 10 and 12 from the destructive loads caused by high acceleration of short duration. The function of bearings 10 and 12 is to support a rotating load 14 for rotation about a stationary member 16 or provide relative rotation between such members 14 and 16. Arranged intermediate to the stationary member 16 and the bearings 10 and 12 is a slide bushing 18. The entire bearing assembly can undergo lateral movement either to the left or right against a pair of springs 20 and 22 which are preferably Belleville type springs because of their high load to deflection ratio. The springs 20 and 22 recenter the load after the high forces are removed. Alternatively, the bearings may be mounted on a resilient ring of, for example, elastic material which acts both as a deflectable support and centering spring. Spacers 38 and 40 are disposed between the bearings 10 and 12. These support the bearing races and transmit bearing race load. A pair of lock rings 24 and 26 hold the entire bearing assembly together.

During momentary high acceleration, which would occur (for example) when a projectile would be shot out of a gun from right to left, the bearing assembly would move to the right such that surfaces 28 and 32 would contact surface 30 simultaneously. In the present configuration, the slide bushing 18 and the rotating load 14 will absorb the high loads due to acceleration. There is minimal load that passes through the balls of the bearings 10 and 12 in the thrust direction. Under loading in the opposite direction, (rebound), surface 42 of member 14 and surface 44 of member 18 will abut surface 46 and again the slide bushing 18 and rotating member 14 will absorb the load. Although two bearings are shown in this configuration, this is exemplary only and one or a plurality of bearings may be used in a similar arrangement. In addition, it must be noted that any bearing using rolling elements that accept axial thrust may also be protected in a similar manner.

The slide bushing 18 may be omitted if adequate load spacers are used between the bearing parts and the base. Also, although a rotating and stationary member are identified, the rotating member could be the stationary member and the stationary member the rotating member. Thus, it is to be understood that the embodiment shown is to be regarded as illustrative only and that many variations and modifications can be made without departing from the principles of the invention herein disclosed and defined by the appended claims.

I claim:

1. In an assembly including a first member and a second member and at least one bearing having a rolling element therein intermediate the first and second members for permitting relative rotation therebetween, apparatus for providing protection of the bearing from destructive loads due to high momentary acceleration of the assembly, comprising:
 means for supporting said bearing for lateral translation; and
 means for providing a surface such that the inner and outer races of said bearing will under high acceleration undergo lateral translation and come to stop simultaneously at said surface.

2. Apparatus as defined in claim 1, wherein said means for supporting said bearing for lateral translation includes a pair of springs arranged either side of said bearing such that lateral translation of said bearing will compress one of said springs.

3. Apparatus as defined in claim 2, further including a slide bushing disposed intermediate said bearing and the first member, said slide bushing disposed against said pair of springs.

4. Apparatus as defined in claim 3, further including a second bearing arranged between said slide bushing and the second member.

5. Apparatus as defined in claim 4, further including first and second spacers disposed, respectively, between the inner and outer races of said bearing and second bearing.

6. Apparatus as defined in claim 5, further including a pair of lock rings for maintaining the relative positions of said bearing, said second bearing, said slide bushing and said spacers.

* * * * *